United States Patent Office 3,041,089
Patented June 26, 1962

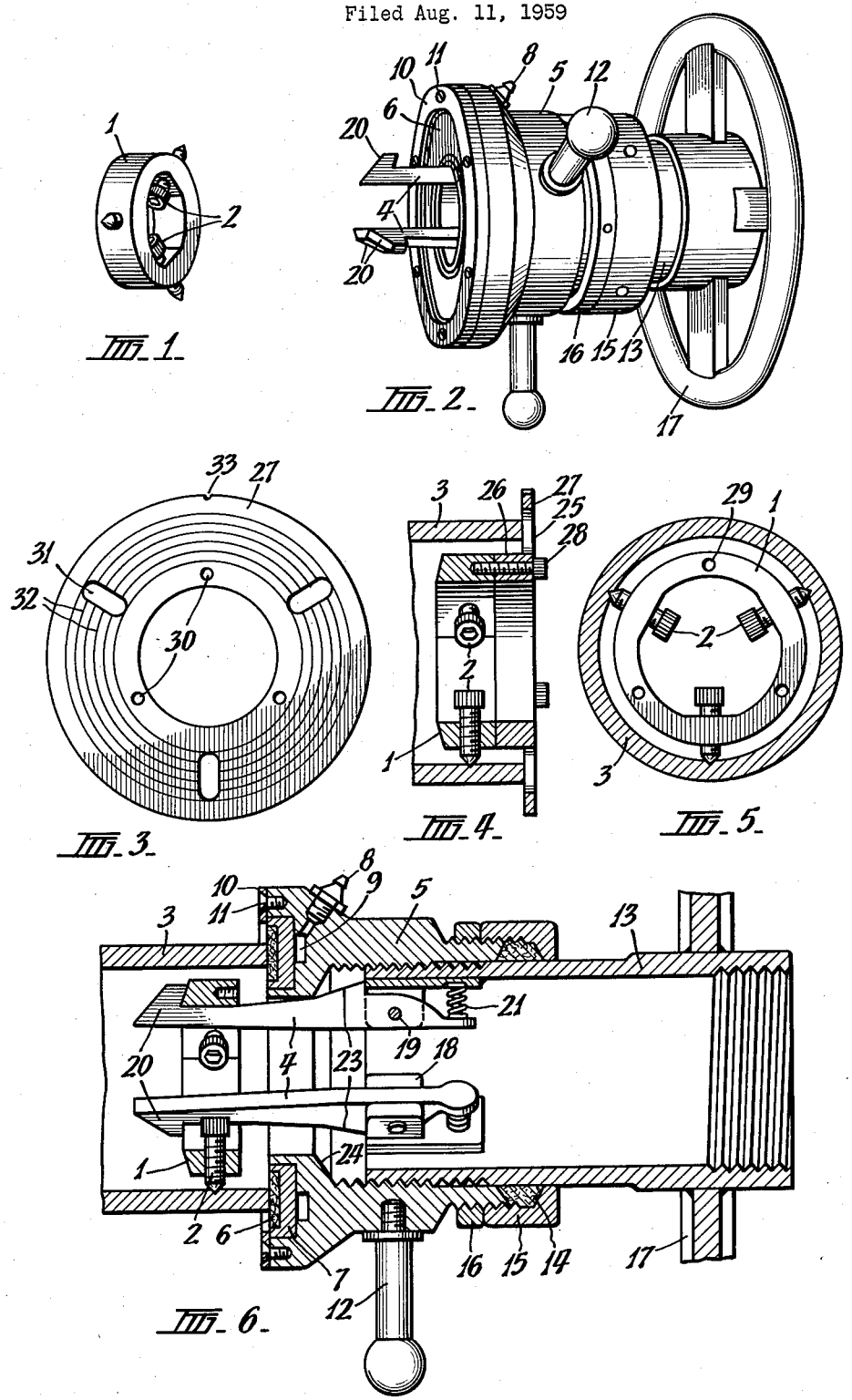

3,041,089
PIPE COUPLING
Frederick William Purves, Fairmile, Dural,
New South Wales, Australia
Filed Aug. 11, 1959, Ser. No. 833,043
Claims priority, application Australia Aug. 14, 1958
2 Claims. (Cl. 285—94)

This invention relates to an improved pipe coupling and refers especially to a coupling which may be used for connecting hoses or conduits to pipe-fittings of various diameters. The term "pipe coupling" in this specification includes couplings which are suitable for connecting hoses or conduits to pipes or tubes and also to couplings which are adapted to connect one pipe or tube to another pipe or tube. The term "pipe-fitting" as used in this specification is employed to indicate any pipe, tube or tubular fixture with which it is desired to make connection by means of a coupling.

In the past, numerous attempts have been made to produce what may be termed a "universal" coupling, that is, a coupling which is capable of use for connecting a hose or the like to a variety of different sizes of pipe-fittings or tubes. However, although the demand for a universal coupling is a substantial one, the couplings of this type which have so far been produced have not been entirely satisfactory for one reason or another.

It is an object of this invention, therefore, to provide an improved coupling of the type in question which will enable a hose or pipe to be connected to pipes or tubes having diameters which may vary within a given range, this range being sufficiently large to ensure that the coupling is suitable for use under a wide variety of circumstances. The maximum and minimum diameters of the pipes with which the coupling may be used should be dependent upon the dimensions of the coupling only so that it may be made in various sizes and thereby be applicable to a larger range of pipes or fittings.

The coupling of this invention is particularly suitable for use on ships, although it is not limited to such use. It is necessary for both naval and merchant ships to connect up to water supply, fuel installations, fire hydrants and the like on shore, and also, at times, to similar installations on other ships, and considerable difficulty has been met with and delays and loss of time have resulted owing to the very large variety of sizes and types of pipes and fittings to which connections require to be made. This is particularly the case where the ship is required to visit a large number of foreign ports. Numerous methods have been adopted in an endeavour to meet this problem, the most common one being for the ship to acquire and carry a large number of different fittings of various sizes and types which are intended to fit the different types and sizes of fittings to which connection has to be made at overseas ports and on other ships and establishments, but this creates a storage problem in the ship and it is also found that in many cases a fitting of the required type and size is not available. Universal fittings which have so far been produced are in most cases very bulky and expensive and are not capable of meeting the requirements outlined above.

Owing to the large number of different types and sizes of male and female threads which are provided on the fittings to which connection is to be made, it is not practicable to provide a single coupling of compact size and of relatively simple and inexpensive construction which is capable of attachment to the threads of the numerous fittings met with in practice. I have discovered that a feature which is common to substantially all of the fittings and connections to which the coupling requires to be attached is that such fittings or connections possess a smooth roughly round bore, and a feature of the present invention resides in the fact that attachment of the coupling to the fittings or connections is effected, by means hereinafter described, to the bore of the fitting or connection.

In accordance with one form of the invention I provide a coupling having: an anchor ring, means for securing the anchor ring firmly within the bore of a pipe or pipe fitting to which the coupling is to be connected, a body, an annular seal associated with the body, a sleeve associated with the body and capable of longitudinal movement relative thereto, means whereby the sleeve and the anchor ring may be engaged and disengaged, and means whereby the sleeve and the body may be moved longitudinally with respect to each other; so that the coupling may be attached to the pipe or fitting by: securing the anchor ring firmly in position within the bore of the pipe, arranging the body at the end of the pipe so that the annular seal abuts therewith, engaging the sleeve with the anchor ring, and moving the sleeve and the body longitudinally with respect to one another so as to compress the seal between the body and the pipe or fitting.

Preferably the body is provided with an internal thread which engages an external thread on the sleeve, and relative longitudinal movement between the body and sleeve being effected by rotating the body and the sleeve relatively to one another. The anchor ring is preferably secured within the bore of the pipe by means of a series of hardened screws, such as those marketed under the trade name "Unbrako," the said screws being disposed radially in the anchor ring and being spaced equally around said ring. Means are preferably provided to enable the annular seal to remain stationary while the coupling body is rotated. The latches are preferably attached to the inner surface of the sleeve and spring-loaded to cause their forward or latching ends to engage the forward end face of the anchor ring when said levers are pushed forwardly through said ring as the coupling is placed in position, and cam faces may be provided on the latches which are engaged by a projection of the like on the body when it is desired to uncouple the coupling, thereby unlatching the latch levers from the anchor ring and permitting the coupling to be removed from the pipe fitting. The invention also includes the provision of a fitting gauge whereby the anchor ring may be mounted in correct alignment within the bore of the pipe or fitting prior to attachment of the coupling.

In order to further describe the invention, a particular embodiment will now be described by way of illustration only. During the following description reference will be made to the accompanying drawings in which:

FIGRUE 1 is a perspective view of the anchor ring and its associated grub screws;

FIGURE 2 is a perspective view of the complete coupling, excepting the anchor ring;

FIGURE 3 is an end elevation of the fitting gauge used to locate the anchor ring before the latter is secured in position;

FIGURE 4 is a sectional elevation of the anchor ring and fitting gauge showing how the latter may be used to position the anchor ring with respect to the pipe or fitting;

FIGURE 5 is an end elevation of the anchor ring in position in a pipe or fitting;

FIGURE 6 is a sectional side elevation of the complete coupling as attached to a pipe or fitting.

In this embodiment of this inventtion, to which the invention is not to be regarded as limited, the anchor ring 1 (see FIGURE 1 particularly) is formed of suitable metal and is of annular shape having an external diameter such that the said ring will fit within the smallest bore of the different types of pipes and fittings to which the coupling is to be connected. The anchor ring is of substantially greater width in the axial direction than in the radial direction and is provided with suitably tapped radial holes at positions which are equally spaced angularly from one another. Preferably three such holes spaced at 120° apart from one another are provided, each tapped hole being adapted to accommodate a hardened steel grub screw 2 for example a screw of the Allen type known by the trade name of Unbrako. Each grub screw 2 is long enough to project outwardly through its tapped hole in the anchor ring 1 and its outer end is formed with a point to enable it to engage the internal face or bore of the pipe or fitting 3 (see FIGURE 5 particularly) to which the coupling is to be attached. The inner end of each grub screw 2 is provided with a polygonal recess which is engageable by the end of a key of L-shape whereby it can be screwed as required.

The forward end face of the anchor ring 1 is tapered or inclined outwardly, and rearwardly (see particularly FIGURES 4 and 6) that is, from the bore of the anchor ring towards its periphery, and in a direction towards the opposite end face of the anchor ring, so as to ensure a locking action when the latches 4 engage the said tapered end face of the anchor ring 1 and tension is applied to them. The bore of the anchor ring 1 may be chamfered at its outer end to facilitate the entry of the latch levers if desired but this is not shown in the drawings as it is often unnecessary.

The body 5 of the coupling incorporates a floating annular seal 6 in its forward face and for this purpose it is formed at one end with an annular recess in which a backing ring 7 for the seal 6 is rotatably accommodated. The gasket-like annular seal 6 fits within an annular recess in the forward face of the backing ring 7 and is preferably formed of suitable resilient sealing material such as leather, rubber, or a suitable plastic, and it may be bonded or otherwise secured in position. To ensure against liquid leakage via the back of the backing ring 7 the rear face of the joint ring is lapped into the groove of recess provided in the body 5. A grease nipple 8 and grease channel 9 are provided so that the relatively moving faces of the backing ring 7 and body 5 may be lubricated. In lieu of employing lubrication for the backing ring 7, the latter may be formed of an anti-friction material which does not require lubrication such as polytetrafluoroethylene and, in such a case, it may be sufficient to do without the seal 6. A retaining ring 10 is screwed to the outer periphery of the forward end of the body 5 by means of the screws 11 and its inner periphery extends inwardly over the outer edge of the backing ring 7 so as to retain the backing ring 7 in position in the recess in the body 5. Outwardly projecting handle bars 12 are secured to the outer periphery of the body 5 and project radially therefrom to enable it to be readily rotated.

The rear and end of the body 5 is internally threaded to enable the engagement of a correspondingly threaded sleeve 13, and the end of the coupling sleeve 13 being externally threaded and normally screwed within the body 5 as shown in FIGURES 2 and 6. A gland of conventional type surrounds the body 5 and sleeve 13 in order to prevent leakage of liquid therebetween. The gland is formed by the annular packing 14, gland ring 15 threadably engaged with the exterior rear surface of the body 5, and a locking nut 16 also threadably engaged with the body 5. A hand-wheel 17 is secured to the periphery of the rear end of the sleeve 13 for the purpose of steadying it and the rest of the coupling during its attachment and detachment to the pipe or fitting 3. The rear end of the sleeve 13 is threaded internally to enable it to be attached to a hose or pipe connection which is standard.

A series of lugs 18 are secured to the interior of the sleeve 13 at its forward end and the said lugs 18 are spaced equally around the bore of the sleeve 13. Preferably the three such lugs 18 are provided and are spaced at 120° apart. One latch 4 is pivotally attached to each lug 18 by means of a pivot pin 19. The latches 4 are of such shape and are so disposed that when the coupling is in position against the end of the pipe 3 they project forwardly through the central aperture in the front face of the body 5 and through the bore of the anchor ring 1 so that their hook-like latching ends 20 engage the tapered forward face of the anchor ring 1. Helical compression springs 21 are provided between the base of the rear ends of the latches 4 and the rear ends of the lugs 18, the springs 21 serving to urge the hook-like forward ends 20 of the latches 4 outwards into engagement with the tapered forward face of the anchor ring 1. The springs 21 are retained in position by recesses provided in the opposite surfaces of the rear ends of the latches 4 and the lugs 18. Abutments 22 on the outer surface of the latches 4 just forward of the pivot pins 19 engage the forward ends of the lugs 18 so as to limit the outward movement of the hook-like ends 20 of the latches 4 and thus ensure that the latches 4 may be readily inserted through the bore of the anchor ring 1 when the coupling is being placed in position.

The latches 4 are provided with outwardly and rearwardly inclined cam faces 23 on their outer edges intermediate of their ends which are engaged by the rear inner edge of an inwardly projecting annular shoulder 24 in the bore of the body 5 when the latter is rotated anticlockwise (assuming a right-hand thread) relative to the sleeve 13 in order to uncouple the coupling, thereby causing the latches 4 to be disengaged from the anchor ring 1. The front faces 24 of the hook-like front ends 20 of the latches 4 also slope outwardly and rearwardly so that when they are pushed towards the anchor ring 1 the abutment of the faces 24 with the inner forward edge of the anchor ring 1 force the forward ends 20 of the latches 4 inwards towards one another.

A fitting gauge 25 (see FIGURES 3 and 4) is provided to enable the anchor ring 1 to be fitted correctly within the bore of the pipe or fitting 3 to which the coupling is to be connected. The gauge 25 comprises a cylindrical spacer portion 26 and a flange 27 formed integrally therewith, the spacer 26 being of similar size to the anchor ring 1 and being adapted to be attached to the end face of the anchor ring 1 by a series of bolts 28 which pass longitudinally through the wall of the spacer by means of the holes 30 into tapped holes 29 in the anchor ring 1. The external diameter of the flange 27 should be substantially greater than the largest external diameter of the range of pipes or fittings to which connection is to be made. A series of radial slots or apertures 31 are provided in the flange 27, the slots 31 preferably being located in alignment with the grub screws 2 which are mounted radially in the anchor ring 1. The rear or normally exposed face of the flange 27 of the gauge 25 is provided with a number of concentric circular grooves or markings 32 which give a ready indication of concentricity for the various pipe fittings. The fitting gauge 25 is also suitably marked by the notch 33 to indicate the correct angular position at which the anchor ring 1 should be mounted in the pipe or fitting 3, a corresponding mark 35 being made on the handwheel 17.

When using the coupling of this invention to attach a standard hose or the like to a non-standard pipe or fitting 5, it is first necessary to check that the end of the pipe 5 is roughly even and square and, if necessary, to file the end of the pipe 5 to ensure this condition. The bore of the pipe 5 is measured, and the grub screws 2 of the anchor ring 1 (which has previously been attached to the gauge 25) are then adjusted in accordance with the concentric markings 32 on the gauge 25 to suit the bore of the pipe 25, the screws 2 being observed through the slots 31 in the gauge 25. The anchor ring 1 and the spacer 26 of the gauge 25 are then pushed into the rear end of the pipe 5 using the guide mark 33 on the flange 27 to ensure that the correct angular position is obtained. The anchor ring grub screws 2 are then tightened finger tight. The use of the gauge 25 in this manner ensures that the anchor ring 1 is located in correct alignment in the bore of the pipe 5. The anchor ring grub screws 2 are then tightened evenly with the appropriate key until the anchor ring is firmly secured in the bore of the pipe when the bolts 28 may be undone and the gauge 25 removed. In one example the grub screws 2 were tightened to give approximately 0.014 inch penetration into the wall of the pipe bore and it was found that the rest of the coupling could be securely attached to the anchor ring. Thus no damage need result from the attachment of the anchor ring 1 to the pipe 3.

After ensuring that the backing ring 7 is free to rotate in the body 5 and that it is properly lubricated the rest of the coupling is offered up to the pipe 5, and the latches 4 are caused to pass through the bore of the anchor ring 1 between the heads of the grub screws 2, the correct angular alignment having been obtained by lining up the guide mark 35 on the hand-wheel with the angle at which the anchor ring 1 has been set by the mark 33 on the flange 27. The coupling is pushed into the pipe until the hook-like ends 20 of the latches 4 engage the tapered forward face of the anchor ring 1, the engagement of the latches 4 with the anchor ring 1 being audible.

Using the hand-wheel 17 to steady the coupling, the body is rotated clockwise by means of the handle bars 12 until the annular seal 6 meets the end of the pipe 5. The handle bars 12 are tightened to a firm hand pressure so as to place the latches 4 in tension and to compress the annular seal 6 against the rear end of the pipe 5 and thus create a liquid-tight seal between the body 3 and the pipe 5. If the standard hose or the like has previously been attached to the rear end of the sleeve 13, the coupling is now ready for use, or alternatively the standard hose or the like may be attached to the coupling after the latter has been connected to the pipe 5 as above described. The coupling of the standard hose to the coupling before the latter is attached to the pipes will not involve subsequent difficulties since there is no need to rotate the sleeve during the coupling action.

When it is desired to remove the coupling, the body 5 is rotated anti-clockwise, by means of the handle bars 12, the hand-wheel 17 being used to steady the coupling until the body 5 is screwed back nearly to the full extent relative to the sleeve 13. The latter part of the movement of the body 5 causes the edge of the shoulder 24 on the interior of the body 5 to engage the sloping faces 23 on the latches 4 and thereby cause the latches 4 to be moved inwardly so that their hook-like ends 20 are moved free of the anchor ring 1 and may be withdrawn rearwardly through the bore of said anchor ring 1 as the coupling is removed rearwardly from the pipe. After the coupling has been removed, the body 5 is rotated clockwise in order to release the latches 4 to their normal position, thus preventing loss of tension in the springs 21. The grub screws 2 are then loosened so that the anchor ring 1 may be removed from the pipe 5.

It will be understood that by means of the coupling of this invention it is possible to attach standard hoses, conduits or the like to non-standard pipes having a wide range of internal and external diameters. The dimensions of the coupling may be increased or decreased if it is desired to provide for connection to a wider range of pipe diameters. In addition to the ability to connect to pipes and fittings having a range of different internal and external diameters, an important advantage of the coupling of this invention is that attachment is made only to the end face and internal bore of the pipe or fitting and consequently the shape or configuration of the exterior of the pipe or fitting, or the type of male thread or the like provided thereon, is immaterial and in no way affects the efficient operation of the coupling and is not damaged by the coupling.

I have found the reduction in bore area and restriction in liquid flow which result from the use of the coupling of the particular embodiment of the invention are so small as to be negligible, even in the case of pipes having a relatively small bore size, and it will be appreciated that the larger the bore size of the pipe the less is the reduction to fluid flow caused by the coupling.

The coupling may also be used for forming a connection between two pipes or fittings; for example, by employing a length of hose or the like which extends between and is connected to a pair of couplings each of which is constructed as above described.

Although one particular embodiment of the invention has been described I do not wish to limit myself strictly thereto since many modifications and additions may be made to it without departing from the scope of the invention.

I claim:

1. A pipe coupling for the connection of a pipe or hose to a pipe-fitting for the conveyance of fluid therebetween, said pipe-fitting having an open end of any bore-diameter within a given range of diameters, said coupling including: an anchor ring having a plurality of regularly spaced radially extending grub-screws whereby said anchor ring may be secured in position within the bore of the open end of the pipe-fitting, a tubular body having a co-axial annular seal on the forward end thereof for sealing engagement with the open end of any pipe-fitting within said range, a tubular sleeve having its forward end located co-axially within the body in screw-threaded engagement therewith and its rear end projecting from the rear end of the body and adapted to receive said pipe or hose, a gland associated with the rear end of the body to effect a seal between the body and the sleeve, and a plurality of spaced latches pivotally attached by their rear ends to the interior of the forward end of the sleeve so as to project forwardly therefrom, each latch having a hook-like enlargement formed on its forward end whereby it is adapted to engage the anchor ring, and having its forward end outwardly biased by a spring, stops being formed on the latch and sleeve to limit the outward movement of the latch, and the hook-like enlargement facing outwardly so as to be capable of engaging the forward face of the anchor ring when passed therethrough, each latch having a first and a second outwardly and rearwardly sloping surface formed on the outer edge thereof, the first surface being formed on the front end of the latch and the second being formed towards the rear end of the latch, an internal annular shoulder being formed in the bore of the body at the forward end thereof for cooperation with said second surface, the arrangement being such that (a) when the anchor ring is secured in position and the body seal is abutted against the pipe-fitting, the forward movement of the sleeve with respect to the body introduces the forward ends of the latches into the anchor ring, the latches being moved inwardly to allow the hook-like projections to pass through the ring by the sliding abutment of said first surfaces with the internal periphery of said ring, (b) the annular seal being then clamped between the body and the pipe fitting by moving the sleeve rearwards, and (c) upon further forward movement of the sleeve with respect to the body, the said body shoulder slidingly abuts with the said second latch surfaces to move the latches inwardly to permit their disengagement and withdrawal from the anchor ring.

2. A pipe coupling for the connection of a pipe or hose to a pipe-fitting for the conveyance of fluid therebetween, said pipe-fitting having an open end of any bore-diameter within a given range of diameters, said coupling including: an anchor ring having a plurality of regularly spaced radially extending grub-screws whereby said anchor ring may be secured in position within the bore to the open end of the pipe-fitting, a tubular body having a co-axial annular seal on the forward end thereof for sealing engagement with the open end of any pipe-fitting within said range, a tubular sleeve having its forward end located co-axially within the body in screw-threaded engagement therewith and its rear end projecting from the rear end of the body and adapted to receive said pipe or hose, a gland associated with the rear end of the body to effect a seal between the body and the sleeve, and a plurality of spaced latches pivotally attached by their rear ends to the interior of the forward end of the sleeve so as to project forwardly therefrom, each latch having a hook-like enlargement formed on its forward end whereby it is adapted to engage the anchor ring; and wherein the forward end of the body has a rearwardly extending co-axial annular recess formed therein, and annular seal backing ring accommodated within said recess, the annular seal being accommodated within said backing ring so that its forward face is exposed for sealing abutment with the pipe-fitting, a backing ring retainer whereby the backing ring is retained in said recess, and at least one passage connecting the interior of the recess to a grease nipple whereby the backing ring may be pressure lubricated to facilitate its rotation relative to the body; the arrangement being such that, when the seal is abutted against the pipe-fitting, the body may be rotated so as to move the sleeve axially so as to clamp or unclamp the annular seal without rotating the backing ring and seal relative to the pipe-fitting.

References Cited in the file of this patent

UNITED STATES PATENTS

| | | |
|---|---|---|
| 98,960 | Harrison | Jan. 18, 1870 |
| 583,576 | Losee | June 1, 1897 |
| 763,317 | Nelson | June 21, 1904 |
| 945,317 | Goodwin | Jan. 4, 1910 |
| 1,250,603 | Loepsinger | Dec. 18, 1917 |
| 2,460,352 | Jensen | Feb. 1, 1949 |
| 2,528,369 | Jensen | Oct. 31, 1950 |
| 2,760,794 | Hartranft | Aug. 28, 1956 |

FOREIGN PATENTS

| | | |
|---|---|---|
| 2,460,352 | Germany | Feb. 1, 1949 |